United States Patent [19]
Steiner et al.

[11] 3,945,706
[45] Mar. 23, 1976

[54] DISTRIBUTION FRAME FOR COMMUNICATION FACILITIES

[75] Inventors: Ewald Steiner, Allmannshausen; Hans Scholtholt, Munich-Tohhof, both of Germany

[73] Assignee: Siemens Aktiengesellschaft, Berlin & Munich, Germany

[22] Filed: Apr. 18, 1974

[21] Appl. No.: 462,100

[30] Foreign Application Priority Data
Apr. 25, 1973  Germany............................ 2320867

[52] U.S. Cl. ......................... 339/113 L; 339/17 C
[51] Int. Cl.[2]........................................... H01R 300
[58] Field of Search......... 339/113 R, 113 L, 113 B, 339/17 R, 17 LM, 17 C

[56] References Cited
UNITED STATES PATENTS
2,848,703   8/1958   Foote et al...................... 339/113 B

*Primary Examiner*—Roy Lake
*Assistant Examiner*—DeWalden W. Jones

[57] ABSTRACT

A distribution frame for telecommunication exchanges or the like is described wherein the frame has a plurality of terminal elements forming an extended terminal board. The terminal elements are assigned to the lines coming in to and going out from the distribution frame, and they are arranged in rows and columns. Designation strips constructed from insulating plastic are attachable to areas of the terminal board along the rows and columns. When so attached, the strips project above the free ends of the terminal elements.

8 Claims, 11 Drawing Figures

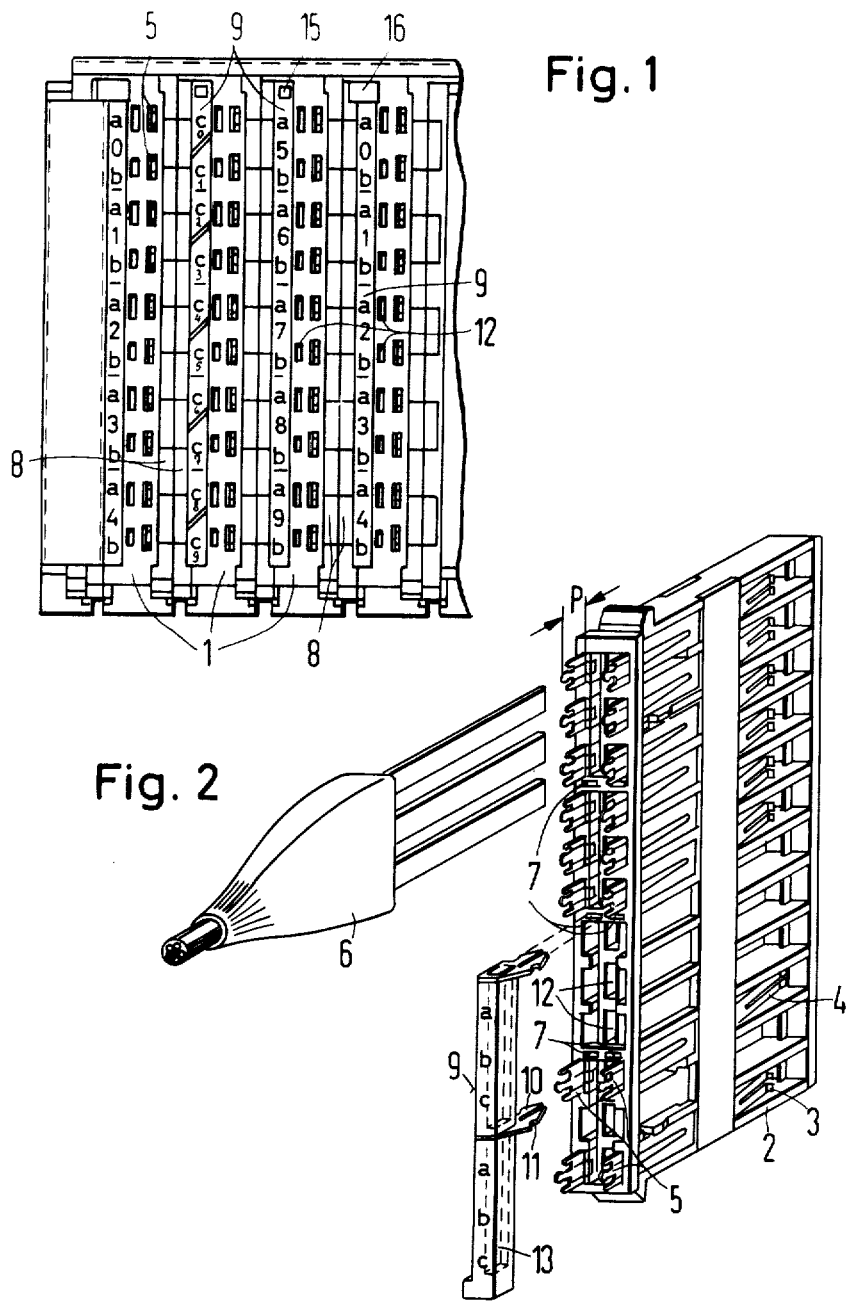

DISTRIBUTION FRAME FOR COMMUNICATION FACILITIES

BACKGROUND OF THE INVENTION

The present invention relates to a distribution frame for communication facilities, i.e., the structure for terminations and connections in a telecommunication facility. The invention can be applied in telephone installations having a multitude of terminal elements forming an extended terminal board. The terminal elements are assigned to the lines coming in at the distribution frame and to those outgoing therefrom, and they are disposed in rows and columns closely adjacent to one another within the terminal board.

In conventional distribution frames, designation strips are mounted on the edge of the terminal board or of individual sections thereof in a manner such that the columns or rows of the terminal board can be marked with figures, letters, colored designations and the like. Despite this identification, it is comparatively difficult under certain circumstances to find a single line termination in the extended terminal board of the distribution frame. This increases the risk of wrong connections. Due to increasing miniaturization in modern distribution systems, there is a need for separate identification of each junction point of the distribution frame.

It is an object of the invention to provide a distribution frame construction of the type referenced hereinabove in which provision is made for clearly identifying the individual junction points in the extended terminal board and to improve the operational reliability of the distribution frame.

SUMMARY OF THE INVENTION

In accordance with the invention, the foregoing and other objects are achieved by providing designation strips on insulating plastic which are attachable to the termination board of the distribution frame along the rows and/or columns. The designation strips project, in attached condition, above the free ends of the terminal elements. By using the designation strips that are directly attachable to the termination board, each individual terminal element, preferably each group of terminal element assigned, for example, to a telephone subscriber, can be marked separately in the direction of the columns and rows. At the same time, the operational reliability of the distribution frame can be increased by causing the designation strips to project above the terminal elements, protecting them against accidental contact.

An advantageous further development of the distribution frame constructed according to the invention is achieved in that the designation strips can be attached to the areas of the terminal board having the terminal elements for the incoming lines and providing the same with concave recesses in which said terminal elements can be laid to rest. In so doing, the designation strips act like attachable protective caps. They protect the terminal elements assigned to the lines coming in at the distribution frame and on which, as a rule, no change-over or switchover operations must be performed. The terminal elements for the outgoing lines (switchover lines) remain freely accessible, but are nevertheless located in a protected position in the immediate vicinity of the designation strips.

According to a further development of the invention, there are provided in the terminal board between the terminal elements or between the groups of terminal elements plug holes for arresting the designation strips provided with appropriate plug parts and preferably with arresting means. These plug holes are preferably disposed between groups of associated terminal elements, e.g., between the terminal elements for the T-, R-, and S-wires of individual telephone paths. The groups are slightly offset from one another so as better to distinguish them from one another. In the present case, the surface between the individual groups is utilized to advantage for placing the plug holes.

BRIEF DESCRIPTION OF THE DRAWINGS

The principles of the invention will be more readily understood by reference to the description of preferred embodiments given hereinbelow in conjunction with the accompanying drawing which illustrates distribution frames constructed according to the invention.

FIG. 1 is a top view of a section of a terminal board of the distribution frame constructed according to the invention.

FIG. 2 is a perspective view of a certain detail of the distribution frame shown in FIG. 1.

DETAILED DESCRIPTION OF THE DRAWINGS

Figure 3:
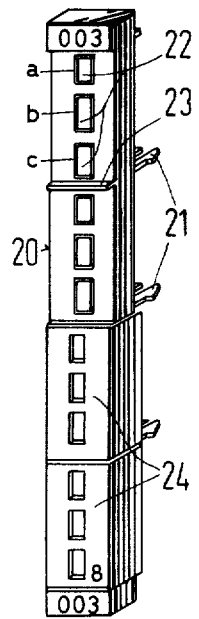
FIGS. 3–6 show designation strips of varying constructions for the distribution frame of FIGS. 1 and 2.

FIG. 1 shows a distribution frame for a telephone switching system. The distribution frame comprises elongated, rectangular structural elements 1 disposed a distance from and parallel to one another. A single structural element 1 is shown in FIG. 2. Resilient contacts 3 and 4 coacting in pairs and forming testing and switching points are mounted in an insulating support 2, and electrically connected to the front of the structural elements by means of clamping terminal elements 5. For clearer identification, FIG. 2 does not show all the contacts and clamping terminal elements of structural element 1. Between the terminal elements 5 coacting in pairs, of which in each case a group of three pairs is allocated to the T-, R-, and S-wires of a subscriber line, the terminal elements disposed on the left side in FIG. 2 are allocated to the lines (switchover lines) coming in at the distribution frame. The terminal elements disposed on the right side in FIG. 2 are allocated to the lines outgoing therefrom. There are provided in the insulating support 2 holes 12 for inserting testing and switching plugs 6. Between the groups of terminal elements 5, the insulating support 2, furthermore, has plug holes 7 allocated in each case to the two rows of terminal elements. As shown in FIG. 1, the terminal board comprises columns and rows which are perpendicular to one another and in which the terminal elements 5 are disposed.

FIG. 1 shows that between the elongated structural elements 1, which are parallel to one another, there are provided exhaust ports 8 of wire-guiding channels (not shown) into which the incoming and outgoing lines are guided to their terminal elements 5.

It is apparent from FIGS. 1 and 2 that insulating designation strips 9 provided with fork-shaped plug elements 10 that are resilient fit into the plug holes 7 and have concave arresting edges 11 that can drop into the plug holes 7. The designation strips 9 provided with markings for the individual wires (T, R) of the lines and for the subscriber code in the form of raised injection-molded or printed letters or figures, have a concave recess 13 on the back side turned away from the identifications. They can be arrested in the rows or columns of the terminal board shown in FIG. 1 by pressing the plug elements 10 thereof into the plug holes 7 in a manner such that the terminal elements 5 for the incoming lines are laid to rest in the recesses 13 for protection against accidental contact, as shown in FIG. 1. The openings 12 for the testing and switching plugs 6, the terminal elements 5 for the outgoing switchover lines and the outlets 8 of the wire-guiding channels remain freely accessible.

Markings for the S-wires of lines are put on a designation strip 9 shown in FIG. 1.

Figure 5:
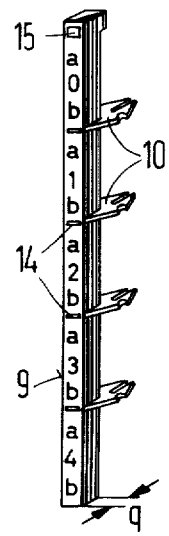
Figure 6:
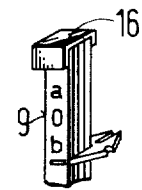

A designation strip 9 is shown as an individual item in FIGS. 5 and 6. Between the terminal blocks a-0-b, a-1-b ... there are provided notches 14 which optically make the individual terminal blocks 11 stand out in sharp contrast to one another. The designation strip possesses a depth $q$ which is greater than the distance $p$ (FIG. 2) of the free ends of the terminal elements 5 from the front of the insulating support 2 so that said designation strips 9 project above the terminal elements 5, thereby protecting the entire terminal board from accidental contact.

FIG. 5 shows furthermore that at the upper end of the designation strip 9 there is provided an engaging opening 15 in which there is arrested an identification plate 16 covering the terminal area of the designation strip 9. On the U-shaped identification plate 16 there is placed, by way of example, a figure marking the current decade of a column of the terminal board.

Figure 7:
FIGS. 7 and 8 are two views of identification plates attachable to the designation strips of FIGS. 5 and 6.
Figure 8:
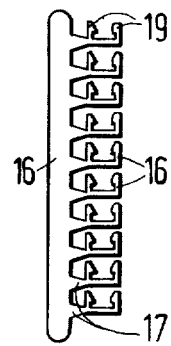

As apparent from FIGS. 7 and 8, identification plates exhibiting all the figures of a decade can be combined in the manner of a strip and interconnected over a common connecting strap 16. For example, such a strip can be made very economically in a die-casting process. On preset breaking points 17 the individual identification plates 16 can be separated from the strip. FIG. 8 further shows that the identification plates 16 are provided with resilient arresting elements 19 which can lock in the engaging openings 15 of the designation strip.

Figure 4:
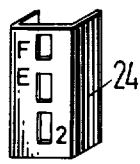

The designation strip 20 shown in FIG. 3 has plug elements 21 substantially similar to the plug elements 10 of FIG. 2. The designation strip is preferably employed for plug-and-socket arrangements for special services of a telephone system constructed like the arrangements shown in FIGS. 1 and 2. In the practical example, the designation strip 20 has openings 22 which are subdivided into groups of three in accordance with the number of wires (T, R, S) of the circuit cords connecting the subscriber line terminations with the line terminations of the special services. Through the openings 22 the plugs of said circuit cords can be attached to the special service systems. The groups of three of the openings 22 are separated from one another by straps 23. A plurality of U-shaped elastic identification carriers 24 (FIG. 4), which identify the special services (e.g., announcement services) allocated to the groups of three through different coloring and designation, can be attached to said designation strip 20.

Figure 9:
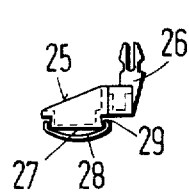
FIG. 9 shows another designation strip of different construction.

The designation strip 25 of FIG. 9 has laterally mounted plug elements 26, a bearing surface 27 for a resilient written or typed identification strip 28, as well as undercut edges 29 for the mounting thereof.

Figure 11:
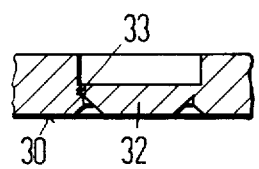
FIGS. 10 and 11 show certain details of a further designation strip with a different form of construction.
Figure 10:
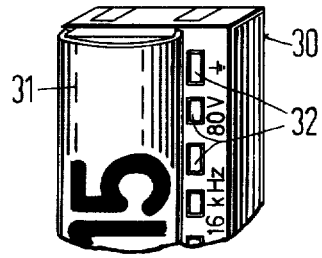

In the practical example of FIGS. 10 and 11, a designation strip 30 constructed as in FIG. 9 has in laterally fixed relationship to a written or typed identification strip 31 a plurality of preset breaking points 32 disposed in a row, whereby, as apparent from FIG. 11, the breakable edges 33 of the preset breaking points 32 are reset with respect to the strip surface. Each preset breaking point 32 is assigned to a symbol for the electrical mode of operation of the system, for example, to a ground symbol or symbols for other electrical engineering strips. A coding can be established by breaking off one or more preset breaking points.

The preferred embodiments described hereinabove are intended to be exemplary of the principles of the invention. It is contemplated that they can be modified or changed in various ways, while remaining within the scope of the invention as defined by the appended claims.

We claim:

1. In a distribution frame for telecommunication exchange facilities having a plurality of terminal elements forming an extended terminal board, the terminal elements being assigned to transmission lines incoming to and outgoing from said distribution frame, said terminal elements being disposed in rows and columns, the improvement comprising:

designation strips having indicating means thereon for identifying individual terminal elements, said designation strips having means for attaching them to a said terminal board along rows and/or columns of said terminal elements, said designation strips being constructed, when so attached, to project above and over the free ends of said terminal elements, said designation strips having formed therein concave recesses for receiving said terminal elements and in which said terminal elements rest, when said designation strips are attached to said terminal board.

2. The improved distribution frame defined in claim 1 wherein said designation strips further comprise plug means, said terminal boards having means for receiving said plug means.

3. The improved distribution frame defined in claim 1 wherein said designation strips include means defining openings through which switching plugs can be extended to attach to terminals on said distribution frame.

4. The improved distribution frame defined in claim 1 further comprising securing means for removably connecting identification plates.

5. The improved distribution frame defined in claim 1 further comprising U-shaped identification plates capable of being resiliently impressed on said designation strips.

6. The improved distribution frame defined in claim 4 further comprising arresting means on said designation strips for holding said identification plates.

7. The improved distribution frame defined in claim 6 wherein a plurality of said identification plates having sets of figures imprinted thereon are interconnected by means of a common connecting strap and are capable of being separated at preset breaking points.

8. The improved distribution frame defined in claim 1 wherein said designation strips have a plurality of preset breaking points which can be selectively broken off to establish a coding.

* * * * *